(12) United States Patent
Kou et al.

(10) Patent No.: US 10,761,828 B2
(45) Date of Patent: Sep. 1, 2020

(54) DEVIATION FINDER

(71) Applicant: Microsoft Technology Licensing, LLC, Redmond, WA (US)

(72) Inventors: Lei Kou, Redmond, WA (US); Zhongyuan Li, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/400,029

(22) Filed: Jan. 6, 2017

(65) Prior Publication Data

US 2018/0196657 A1    Jul. 12, 2018

(51) Int. Cl.
*G06F 8/65* (2018.01)
*G06F 11/36* (2006.01)

(52) U.S. Cl.
CPC .......... *G06F 8/65* (2013.01); *G06F 11/362* (2013.01); *G06F 11/3604* (2013.01)

(58) Field of Classification Search
CPC . G06F 11/3636; G06F 11/3604; G06F 11/362
USPC .................................................. 717/168, 128
See application file for complete search history.

(56) References Cited

U.S. PATENT DOCUMENTS

| | | | |
|---|---|---|---|
| 6,202,199 B1 | 3/2001 | Wygodny et al. | |
| 6,895,578 B1* | 5/2005 | Kolawa | G06F 11/3624 714/E11.209 |
| 8,028,200 B2 | 9/2011 | Ivanov et al. | |
| 8,132,157 B2 | 3/2012 | Dhuvur et al. | |
| 8,196,115 B2 | 6/2012 | Dimpsey et al. | |
| 8,276,126 B2 | 9/2012 | Farnham et al. | |
| 8,359,581 B2 | 1/2013 | Ortiz | |
| 8,468,503 B2* | 6/2013 | Grosse | G06F 17/5081 714/38.1 |
| 8,924,932 B2 | 12/2014 | Granshaw et al. | |
| 9,158,514 B2 | 10/2015 | Guan et al. | |
| 2007/0168343 A1* | 7/2007 | Best | G06F 17/30675 |
| 2010/0299654 A1 | 11/2010 | Vaswani et al. | |
| 2014/0310688 A1* | 10/2014 | Granshaw | G06F 11/366 717/123 |

(Continued)

FOREIGN PATENT DOCUMENTS

WO    2015200508 A1    12/2015

OTHER PUBLICATIONS

Gao, et al., "Pushing the Limits on Automation in GUI Regression Testing", In Proceedings of the IEEE 26th International Symposium on Software Reliability Engineering, Nov. 2, 2015, 11 pages.

(Continued)

*Primary Examiner* — Wei Y Zhen
*Assistant Examiner* — Clint Thatcher

(57) ABSTRACT

Automatic detection of software program regression points enables developers to more quickly and accurately diagnose and solve issues in changes to software. Traces of instructions are collected from before and after a change to a program or settings thereto on a computing device and are compared to identify differences between the two traces. Areas of differences are ranked and returned to identify the point(s) of regression in the traces to alert a user of programs of behaviors to avoid and/or a developer a point to focus efforts on to patch the responsible program or update other programs around the responsible application.

19 Claims, 5 Drawing Sheets

(56) References Cited

U.S. PATENT DOCUMENTS

2015/0254161 A1    9/2015  Baril et al.

OTHER PUBLICATIONS

Baseer, et al., "Root Cause Detector: Tool for Detecting Root Cause of Regression Bugs", In International Journal of Advanced Research in Computer Science and Software Engineering, vol. 4, Issue 1, Jan. 2014, pp. 1082-1091.

Heger, et al., "Automated Root Cause Isolation of Performance Regressions during Software Development", In Proceedings of the 4th ACM/SPEC International Conference on Performance Engineering, Apr. 21, 2013, 12 pages.

Storzer, et al., "Trace Analysis for Aspect Application", In Workshop on Analysis of Aspect-Oriented Software, May 30, 2003, 6 pages.

* cited by examiner

MOBILE COMPUTING DEVICE

DEVIATION FINDER

BACKGROUND

Within an operating an environment, several software programs (e.g., operating systems, applications, device drivers, firmware) run simultaneously on a given set of hardware components. These programs may interact with one another, passing data back and forth to perform various functions. Updates to one or more programs within the operating environment, however, can disrupt the flow of data between programs, and can lead to one or more programs producing aberrant behaviors or regressions, including crashing. These regressions, as will be appreciated, cause user frustration and degrade the functionality of the computing devices on which the programs are run. Unfortunately, because the programs are often supplied by different developers, knowing which program to revert to a previous version, upgrade to a new (compatible) version, or disable to allow another program to run without interference, is often a laborious process full of guess-work.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are provided herein that improve the functionality of a computing device in dealing with program regression in light of changes to the programs. A deviation finder logs the execution results of the programs as traces from the programs during runtime and analyzes two traces, from before and after a regression is detected, to identify runs of different instructions in the traces. In various aspects, the deviation finder has access to the source code of the programs; debugging access to the programs, but not source code access; or has neither access to the source code or debugging access, such as, for example, when the program is run on a remote service and transmits its executable results to the user device as software as a service. Runs within each trace are, in some aspects, grouped together as instruction blocks so that a smaller portion of the traces need to be compared to identify the point of regression. Once the point of regression is identified, that point may be transmitted to developers (to produce a patch or update to remove the regression point) and/or transmitted to a user to identify behaviors or programs to avoid using to circumvent the regression.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
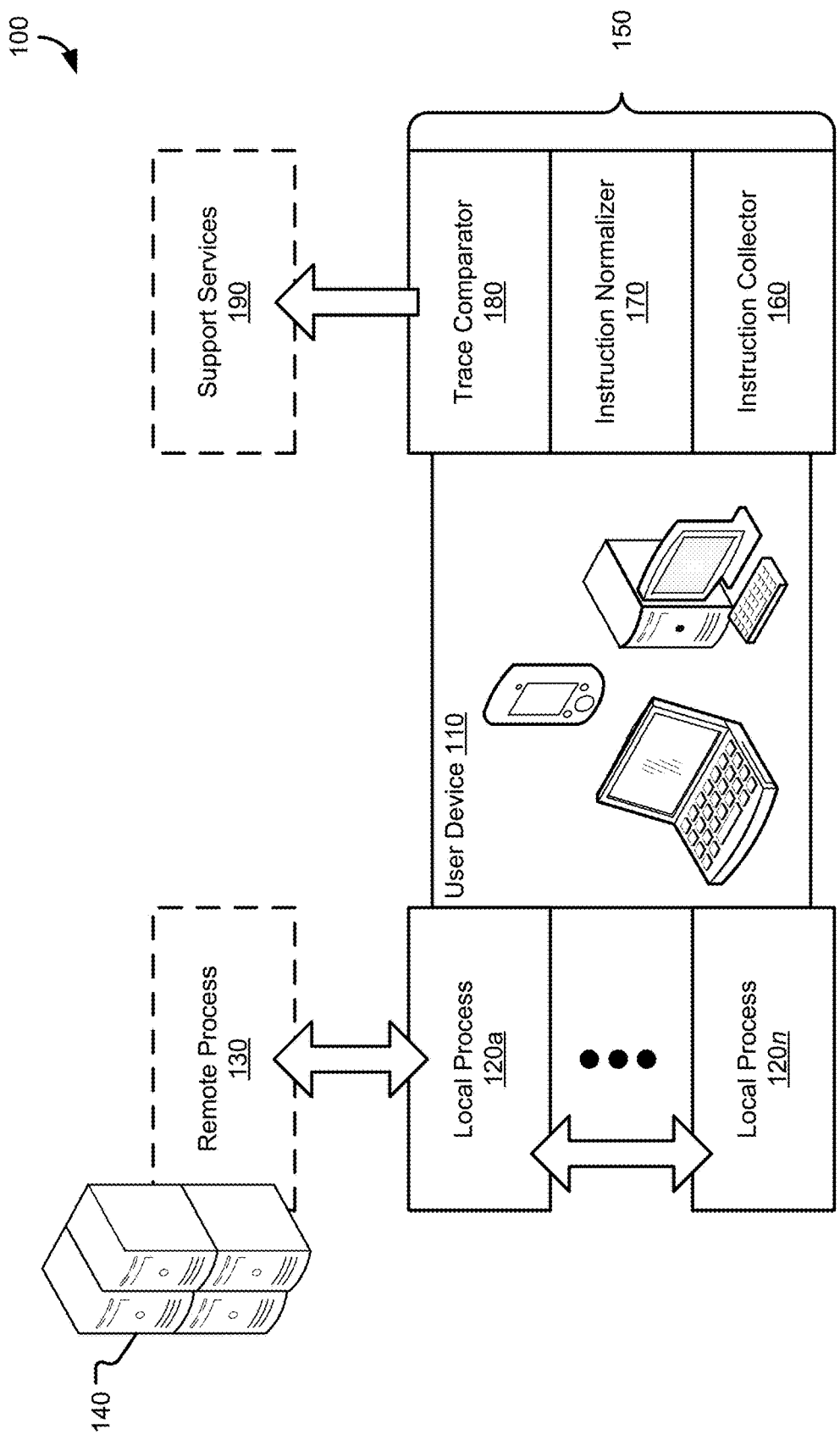
FIG. 1 illustrates an example operating environment.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

When aspects of a computing environment are changed (e.g., by installing, uninstalling, updating, or otherwise changing software or hardware of the computing environment), some software may not execute as intended after the change. This often leads to users noting that "but it worked before" and user frustration as developers either engaged in a lengthy manual debugging processes or leave the users to their own devices to work around the aberrant behavior. The debugging process can be particularly challenging for developers, as the source code that they have access to may be affected by programs or hardware to which they do not have the access to; leaving them to guess at what functionality of their source code was affected and what functionality of some other program affected it. The present disclosure describes systems, methods, and computer readable storage devices embodying instructions, configured to provide automatic program regression detection and thereby improve the functionality of computing devices when handling regressions in programs.

FIG. 1 illustrates an example operating environment 100 in which the present disclosure may be practiced. A user device 110 is illustrated, which runs one or more local processes 120a-n (generally, local process 120). One or more of the local processes 120 are in communication with another local process 120 or a remote process 130 running on a remote device 140. A deviation finder 150 is also run on the user device 110, and includes an instruction collector 160, an optional instruction normalizer 170, and a trace comparator 180, which are configured to identify regression points in various sets of instructions in the event of a regression on the user device 110. In various aspects, the deviation finder 150 is in communication with support services 190, to alert a user or a developer of the regression point so that ameliorative action may be taken. In other aspects, the instruction normalizer 170 and the trace comparator 180 are run on a remote device 140 on which the support services 190 for a developer are also run; collecting traces collected on user devices 110 collected by instruction collectors 160 on those user devices 110.

While a given number of the component systems of the example operating environment 100 are shown in FIG. 1 for illustrative purposes, it should be noted that each illustrated system may represent multiple instances of that system. Various servers and intermediaries familiar to those of ordinary skill in the art may lie between the component systems illustrated in FIG. 1 to route the communications between those systems, which are not illustrated so as not to distract from the novel aspects of the present disclosure.

The user device 110 and the remote device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 3-4B.

The local processes 120 are executed by software programs (e.g., operating systems, applications, device drivers, firmware) running on the user device 110 that submit instructions to a processor of the user device 110 to perform, and one program may support many local processes 120. For example, an operating system may run several processes 120 while a purpose-built application (e.g., a browser, a word processor or other productivity application, a game) runs a single process 120. The instructions designate various commands that are run on the user device 110, registers from which to read values, registers to which to write values, and/or constant values. Various instruction sets may be used depending on the processor architecture, which may vary in length and content depending on the instruction set or the given instructions.

In some aspects, such as when a program is a thin client running on the user device 110 as an interface for a remote process 130, instructions are generated for execution on the user device 110 and the remote device 140. In such aspects, instructions from the remote process 130 are optionally collected by the deviation finder 150 for analysis in conjunction with the instructions from the local process 120 in communication with the remote process 130.

The deviation finder 150 is configured to identify the reason behind a program regression without requiring access to the code base of the programs running the local processes 120. In various aspects, a program regression is identified in response to a program closing unexpectedly (e.g., not through a close command within the application), a user manually closing a program through a task manager or other system dialog, or another program forcing the program to close.

An instruction collector 160 of the deviation finder 150 records the instructions submitted from the local processes 120 for execution on the processor of the user device 110. The local instructions are organized into traces based on an order in which the instructions are handled by the processor. In aspects where the user device 110 includes multiple processors or processors with multiple cores, the instructions are organized according to the local process 120 that submitted the instruction or the processor/core on which the instruction is executed.

In aspects where the instructions are submitted by a remote process 130 for execution on a remote device 140, the instruction collector 160 is further configured to associated the remote instructions with the local instructions, whether in the local trace or by associating a local trace with a remote trace, so that regressions that involve the pair of the local process 120 and the remote process 130 can be compared to a known good trace pair in the event of a regression.

An instruction normalizer 170 of the deviation finder 150 is configured to normalize and simplify the instructions observed into instructional blocks for analysis. To normalize the instructions observed, the instruction normalizer 170 analyzes the instructions at a machine-level according to various analysis patterns. In one aspect, the identities of the instructions are gathered without regard to the values of the arguments (e.g., using different values or affecting different registers, but calling the same command).

To simplify the observed instructions, groups of program flow instructions are identified from the sequence of observed instructions. Instructions submitted at the machine level are often very basic and may be aggregated to form more complex instructions, represented as instructional blocks by the instruction normalizer 170. For example, multiplying a value held in a register by two may involve a single shift operation, but handling potential register overflow for the multiplication may include several additional steps that will be included in a multiplication function's instructional block. To illustrate, consider a four-bit register where the value of one is multiplied by two via a left shift instruction such that the register's contents of $0001_2$ are shifted one bit to the left to return a value of two in a register as $0010_2$. In another illustration, where the four-bit register contains the value of eight as $1000_2$, when a left shift instruction is received the value may return as zero $0000_2$ or one $0001_2$ (depending on the implementation), which will need to be indicated as an error or overflowed to an additional bit to properly represent sixteen as $0001\ 0000_2$, which are handled by additional instructions at the machine level despite occurring in a single higher-level function in a human-readable programming language (i.e., multiply X by Y). The instructions of more complex functions than the above example, written in various human readable code languages (e.g., C#, JavaScript, Visual Basic, Cobol) may be grouped together by the instruction normalizer 170; the foregoing is understood to be an illustrative and non-limiting example.

When grouping instructions, certain instructions, referred to as program flow instructions, indicate the start of one instruction block and the start of another instruction block. For example, in the x86 instruction set, program flow instructions including JMP (jump), CALL (call procedure), RET (return from procedure), etc., are used to designate the start of a new function. All of the machine level instructions between two program flow instructions in the sequence of instructions will be grouped into an instruction block, which may then be hashed according to various hashing functions to provide a uniform size for each instruction block. The instruction normalizer 170, in various aspects, normalizes sequences of instructions into instructions blocks, such that a first block of instructions (i.e., $Block_A$) between a first and a second program flow instruction is represented as Hash ($Block_A$) and a second block of instructions (i.e., $Block_B$) between the second and a third program flow instruction is represented as Hash($Block_B$). In other aspects, the instruction normalizer 170 normalizes the sequence of instructions into function calls via a symbol file, such that output are represented as equivalent list of high level functions (CALL: A, CALL:B, CALL:C, etc.).

As will be appreciated, different compilers and processor architectures may perform the same high-level function with a different set or sequence of instructions at the machine level, and a given function index may be specific to a given compiler, processor architecture, or user device 110. A given function index may be pre-populated with function definitions as well as built over time as the instruction normalizer 170 identifies patterns in instructions observed executing on processors. When building the function index over time, a sequence of machine-level instructions may be seen in repeated sets, which will be added to a function index so that when a particular sequence of instructions is seen again, the instruction normalizer 170 will group those instructions into a block for manipulation and analysis as a group.

A trace comparator 180 of the deviation finder 150 is configured to compare two or more traces together to identify deviations between a known good trace and a trace related to a regression to identify candidate causes for the regression based on the observed instructions and/or instruction blocks In various aspects, the trace related to the regression is the series of n instructions or instruction blocks that occurred immediately before a regression, and the known good trace is gathered prior to an update to one or more settings/applications on the user device 110. Differences in the order or identity of the system events stored in the traces are identified by the trace comparator 180, which ranks the deviations between the traces based on the number of differences in a given section of the traces—a deviation run. The lengths of the deviation runs are used to provide interested users with candidate causes for the regression that are based on the level of difference between the two traces; the longer the deviation run, the more differences between the two traces in a given set of system events, and therefore the more likely that the regression was caused by the deviation.

As will be appreciated, in some aspects, deviation runs include some sequences in common between traces. For example a first trace of the system events of A-B-C-D-E-F and the second trace of the system events of A-Z-Y-B-C-X-W-V deviate by the second trace including events of Z, Y, X, W, and V, which are separated by the shared events of B and C. In various aspects, the deviation run in the above example may be Z-Y-B-C-X-W-V or may be treated as two deviation runs (of Z-Y and X-W-V) based on system settings for how deviation runs are defined relative to shared system events occurring between deviation runs.

In various aspects, the trace comparator 180 identifies, via a symbol file, the programs, processes, and/or the functions present in a deviation run to provide greater human readability of the candidate causes of the regression. In other aspects, a support services 190 application is used to identify the programs, processes, and/or the functions present in a deviation run. For example, instead of or in addition to identifying a regression point as an instruction that starts the run of deviations in the traces, the program or processes identified as submitting instructions within or prior to the deviation run are identified and the function names associated with instruction blocks identified by the instruction normalizer 170 are also returned.

A support services 190 application is in communication with the deviation finder 150 in some aspects to gather and alert interested users (including developers) of the regression and the deviation run(s) suspected to have caused the regression. In various aspects, the support services 190 are run on the user device 110 or a remote device 140, such as, for example, a developer's crash-log server, an enterprise information technology quality assurance server, or the like. The support services 190 receive one or more deviations runs, which may be organized in a list of deviation runs based on the length of the deviations, and provide alerts to the interested users.

In aspects where the support services 190 are provided on the user device 110 for alerting the local user, the support services 190 may be integrated into a crash handling application for an operating system. For example, an operating system crash handling application incorporating the support services 190 may alert the local user of two or more programs that are interfering with one another, and recommend that one or more of the programs be run in isolation, for a patch or update to be searched for/applied, a version to be downgraded, settings to be restored to a prior state, or other regression remediation suggestions.

In aspects where the support services 190 are provided for the use of a developer, the support services 190 may be specific to a given program, and is transmitted the deviation run(s) based on the given program being implicated in the deviations (e.g., a process run by the given program is observed in the deviation run). The developer's support services 190 application is configured to receive deviation reports from multiple user devices 110, and to analyze the deviation reports to identify shared deviation runs in the reports. In various aspects, the position or rank of the deviation run in the report is used to weight the analysis of multiple deviation reports to identify potential regression points on which to focus developer efforts to produce a patch or update to address.

Figure 2:
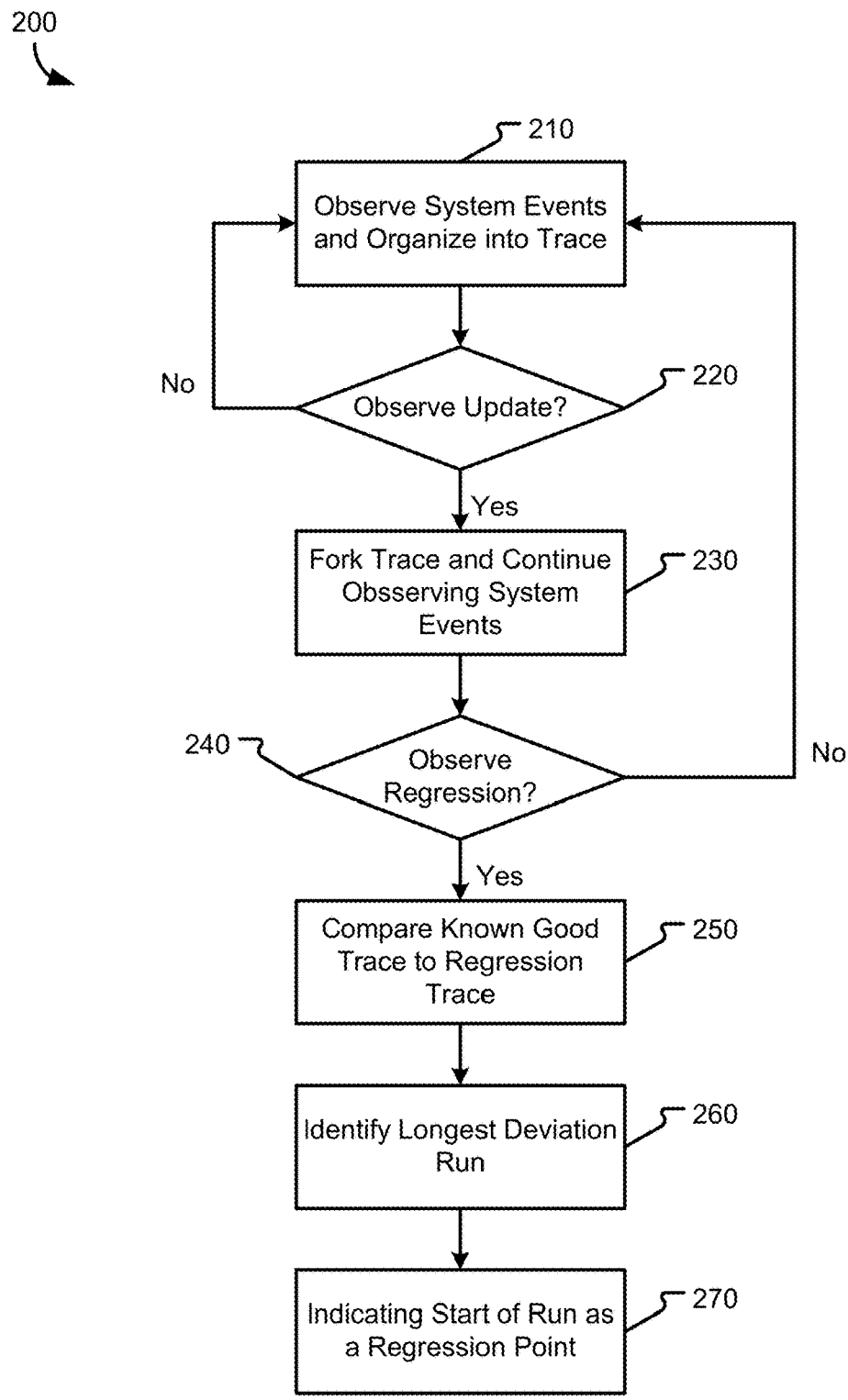
FIG. 2 is a flow chart showing general stages involved in an example method for automatic program regression detection.

FIG. 2 is a flow chart showing general stages involved in an example method 200 for automatic program regression detection. Method 200 begins with OPERATION 210, where system events are observed and organized into traces. The traces include the observed system events as well as the settings or versioning information under which the system events were observed (e.g., program A is running version X, program B is running version Y, and hardware component C has properties Z).

In various aspects, the system events include instructions executed on a processor of a computing device, which are organized into the trace based on a given process that initiated the instruction, an order of execution, whether the instruction was received as part of a function, and combinations thereof. For example, for a user device 110 that includes multiple processors (or cores), instructions on a given processor are gathered in the order in which they are executed on the given processor, and are optionally correlated to the instructions executed on other processors at the same time. In various aspects, groups of instructions in the traces are normalized into instructional blocks corresponding to functions defined in a function index.

In additional aspects, where the local process 120 is in communication with a remote process 130, a remote trace is organized on the remote device 140 and associated with the local trace. For example, a user authoring a document on a thin client on the user device 110 may edit the document in a software-as-a-service application running as a remote process 130. The system events occurring on the user device 110 and the remote device 140 in the current example are associated with one another to potentially detect regressions cause by the interaction of updates to the user device 110 and/or the remote device 140.

Proceeding to DECISION 220, it is determined whether an update to the user device 110 has occurred. In various aspects, an update includes, but is not limited to: software changes (e.g., patches, version changes, installation/removal of software), hardware changes (e.g., new hardware is added, old hardware removed, hardware failures), hardware settings changes (e.g., the hardware remains the same, but is configured to behave differently via a new driver or driver setting change), software settings changes (e.g., a plugin is enabled/disabled), or other updates that may result in a regression or other aberrant behavior in one or more local processes 120. In response to observing an update, method 200 proceeds to OPERATION 230 and otherwise returns to OPERATION 210.

As will be appreciated, not all observed updates are treated as potentially leading to a regression. For example, when a program is patched or a new video card is added to the user device 110, it will be determined that an update has been observed that may lead to a regression, and method 200 will proceed to OPERATION 230. Conversely, when a mouse (or other pointing device) for the user device 110 is changed or a memory stick (or other memory storage device) is inserted/removed, it will be determined that an update has been observed, but that update is unlikely to lead to a regression, and method 200 will return to OPERATION 210. Various update types are noted in different aspects as likely or unlikely to lead to aberrant behavior in programs, and may be acted upon or ignored at DECISION 220 respectively. In other aspects, only updates to certain programs or particular hardware (e.g., an operating system, memory chips) are listened for to cause method 200 to proceed to OPERATION 230 when observed, and other updates (e.g., to other programs or hardware) are not listened for and are therefore never observed.

At OPERATION 230, in response to observing an update that may lead to a regression, the trace is forked, and system events are continued to be observed and are organized into a new trace. The deviation finder 150 may retain a plurality of traces from prior forks for comparison to the current trace in the event of a regression being observed.

It is determined at DECISION 240 whether a regression has been observed. A regression may, for example, be observed in response to a program crashing or closing unexpectedly, or a user manually noting aberrant behavior in a program. In response to observing a regression, method 200 proceeds to OPERATION 240, otherwise method 200 continues to observe system events and organize them into the current trace at OPERATION 210.

In response to observing a regression, the current trace is compared to a prior trace at OPERATION 250. The prior trace represents a first "known good" trace in which the regression was not observed, and the current trace represents a second "regression" trace in which the regression was observed. As will be appreciated, during patching efforts to solve a regression, the regression may not be solved in the first attempt or a new regression may be introduced, therefore the "known good" trace may be the trace immediately prior to the "regression" trace or may have been collected in an even earlier trace.

When comparing the first trace and the second trace, regions of the traces that are not the same are noted. These regions that deviate between the two traces may be based on individual instructions or on normalized blocks of instructions representing functions. For example, when comparing instruction blocks, a process may make the same function call in the first trace and the second trace, invoking the same instructions in the same order, but (potentially) with different constants and referenced registers, and be considered not a deviation despite having variations in its instructions. Conversely, when comparing instructions blocks, for example, when function A is followed by function B in the first trace, but function A is followed by function C in the second trace, a deviation is observed.

When comparing a first trace to a second trace, due to the potentially large size of a trace before a regression occurs, in some aspects the second trace is limited to the n system events occurring before the regression occurred to reduce the amount of processing needed to compare the first and second traces. Similarly, key blocks in the traces may be used as starting points for the comparison in different aspects. For example, a function or instruction block related to an initialization of a particular program that is noted as having crashed or otherwise behaved aberrantly is used as a starting point in the first and second traces. As will be appreciated, the traces may include several such key blocks, from which one or more may be selected as starting points in various comparisons.

At OPERATION 260 the longest run of deviations between the first trace and the second trace is identified. In various aspects, shorter runs of deviations are also identified and included in a ranked list of deviation runs based on their respective lengths. The length of the number of deviations in a run is used to rank the list as small differences between two traces may occur naturally due to different user behaviors, interrupts, changed priority handling of instructions between executions, etc., but a larger number of differences in two traces is statistically less likely due to natural execution variations.

As will be appreciated, processes may inject instructions for functions for immediate execution as interrupts, which may disrupt the order of execution without disrupting the behavior of the underlying programs. Therefore, runs of deviations may require at least x different system events to occur over a run of y system events, thereby limiting a run's length. For example, if the first trace comprised the system events of A-B-C-D-E-F-G-H-I-J-K and the second trace comprised the system events of A-B-L-M-N-O-B-C-D-E-F-G-H-I-J-K, the deviation run may be determined to comprise the system events of L-M-N-O-B-C, and not include the rest of the system events in the second trace (D though K), as the system events reverted to those seen in the first trace.

Proceeding to OPERATION 270, the start of the longest run is indicated as the regression point; where the aberrant behavior is suspected to have initiated. In various aspects, the instruction block or instruction at the start longest run is included in a ranked list of all (or the top n of) the deviation runs based on the length of the runs of deviations. The program(s) or process(es) associated with the regression point and the deviations may also be indicated in various aspects. In different aspects, the regression point is indicated to a user of the user device 110 and/or submitted to a support services 190 application (local or remote to the user device 110). Method 200 may then conclude.

While implementations have been described in the general context of program modules that execute in conjunction with a program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
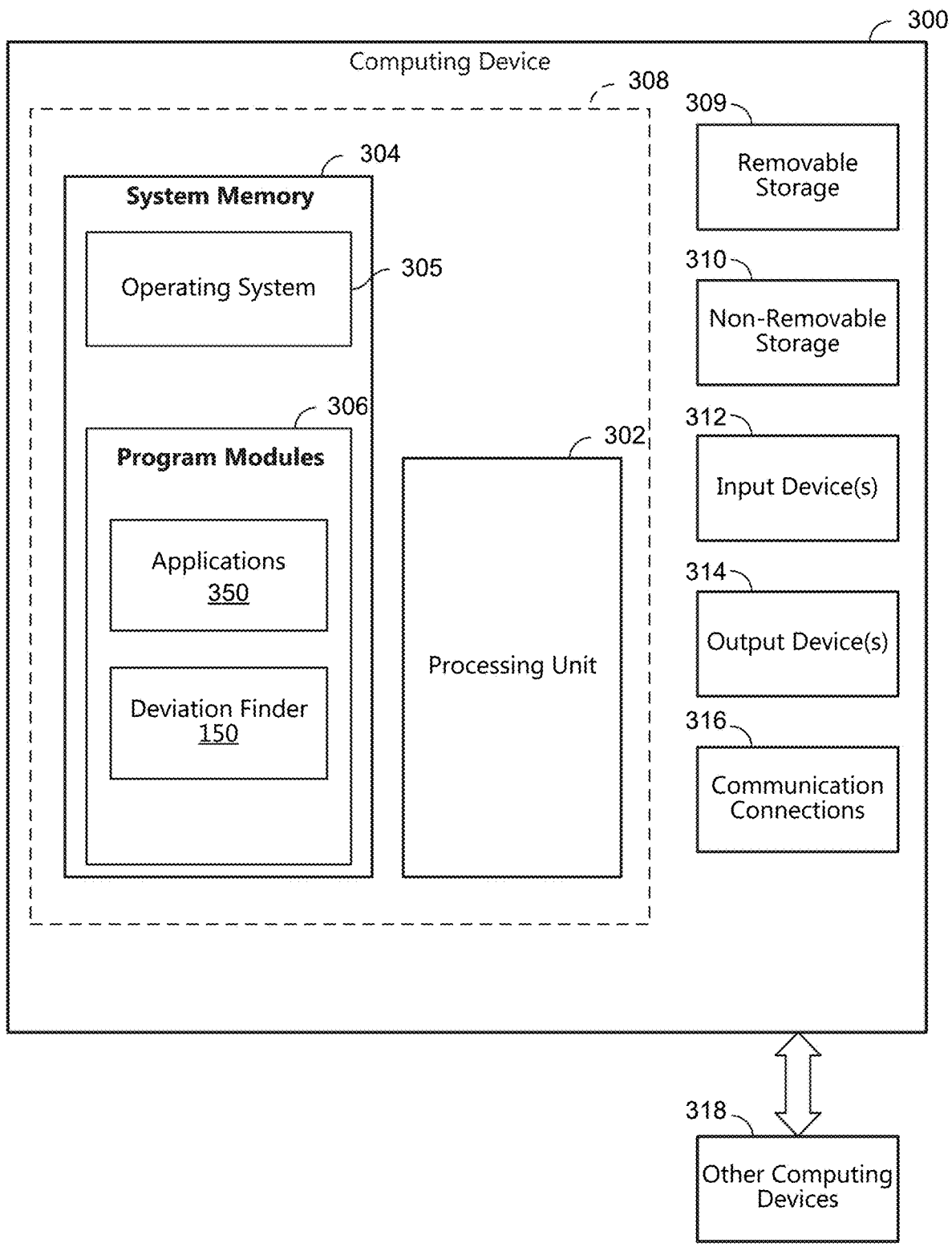
FIG. 3 is a block diagram illustrating example physical components of a computing device.
Figure 4A:
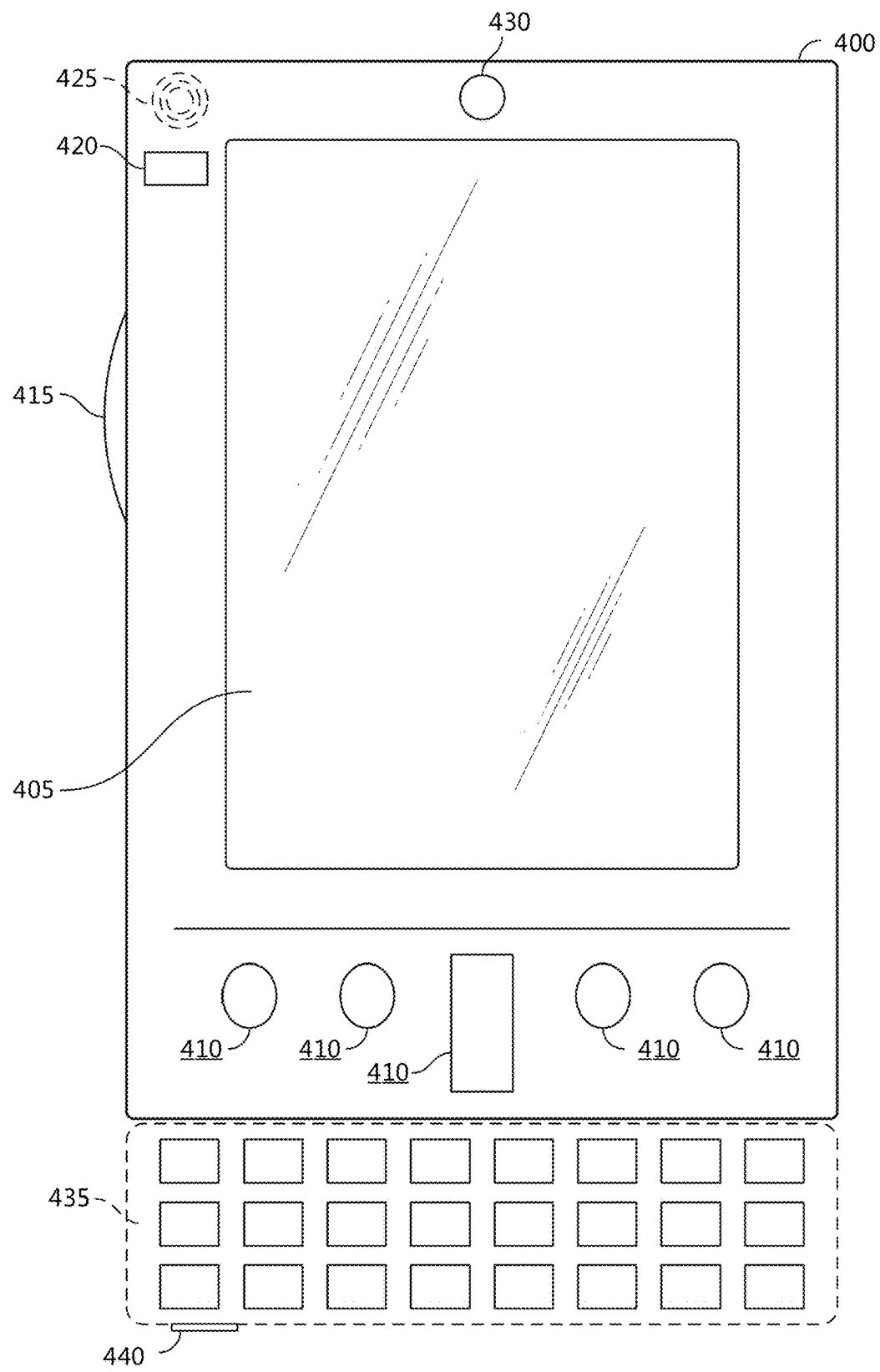
FIGS. 4A and 4B are block diagrams of a mobile computing device.
Figure 4B:
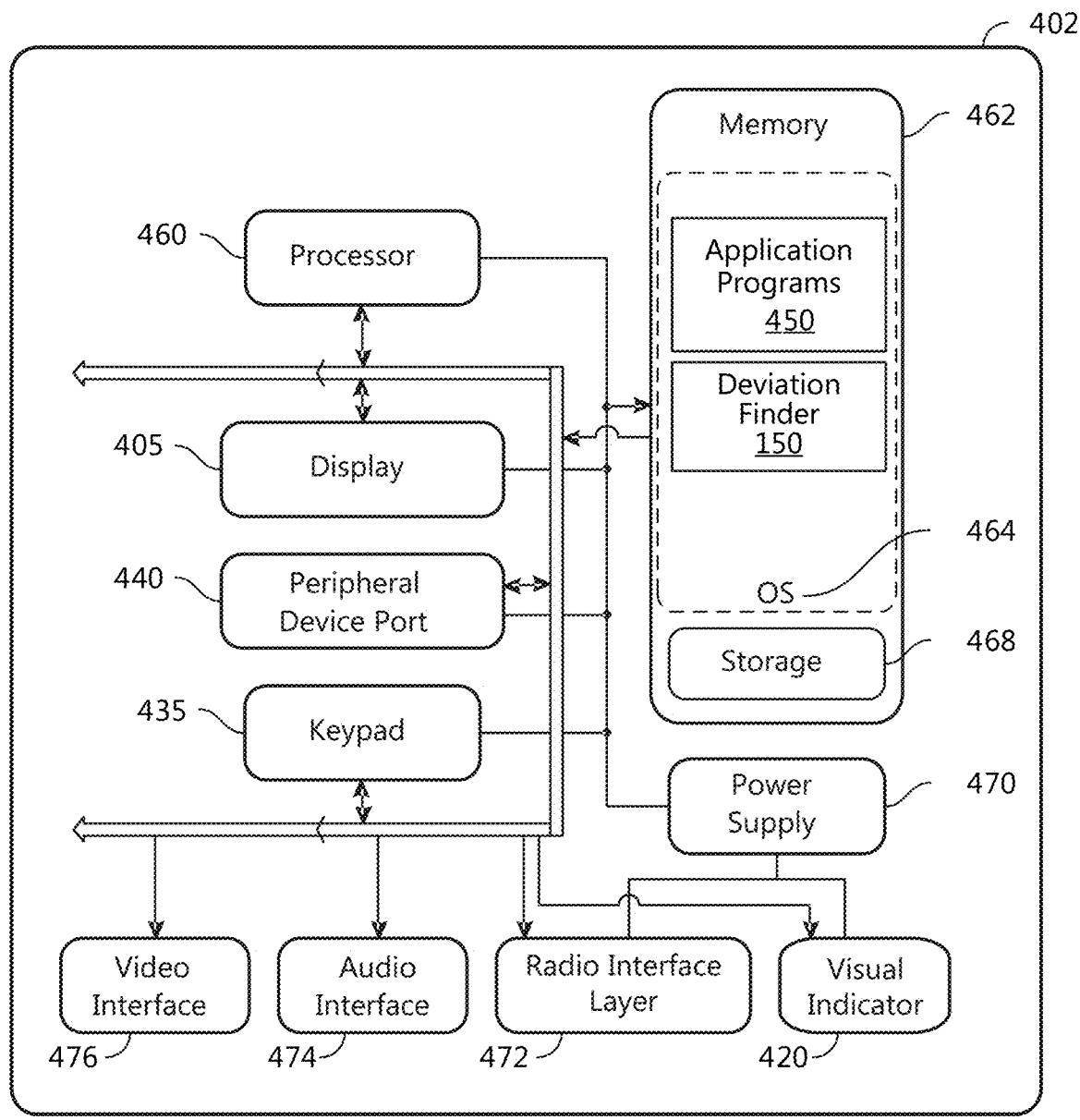

FIGS. 3-4B and the associated descriptions provide a discussion of a variety of operating environments in which examples are practiced. However, the devices and systems illustrated and discussed with respect to FIGS. 3-4B are for purposes of example and illustration and are not limiting of a vast number of computing device configurations that are utilized for practicing aspects, described herein.

FIG. 3 is a block diagram illustrating physical components (i.e., hardware) of a computing device 300 with which examples of the present disclosure may be practiced. In a basic configuration, the computing device 300 includes at least one processing unit 302 and a system memory 304. According to an aspect, depending on the configuration and type of computing device, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software programs 350. According to an aspect, the system memory 304 includes deviation finder 150. The operating system 305, for example, is suitable for controlling the operation of the computing device 300. Furthermore, aspects are practiced in conjunction with a graphics library, other operating systems, or any other software program 350, and are not limited to any particular application or system. This basic configuration is illustrated in FIG. 3 by those components within a dashed line 308. According to an aspect, the computing device 300 has additional features or functionality. For example, according to an aspect, the computing device 300 includes additional data storage devices (removable and/or non-removable) such as, for example, magnetic disks, optical disks, or tape. Such additional storage is illustrated in FIG. 3 by a removable storage device 309 and a non-removable storage device 310.

As stated above, according to an aspect, a number of program modules and data files are stored in the system memory 304. While executing on the processing unit 302, the program modules 306 (e.g., deviation finder 150) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 300 has one or more input device(s) 312 such as a keyboard, a mouse, a pen, a sound input device, a touch input device, etc. The output device(s) 314 such as a display, speakers, a printer, etc. are also included according to an aspect. The aforementioned devices are examples and others may be used. According to an aspect, the computing device 300 includes one or more communication connections 316 allowing communications with other computing devices 318. Examples of suitable communication connections 316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. According to an aspect, any such computer storage media is part of the computing device 300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a tablet personal computer, a laptop computer, and the like, with which aspects may be practiced. With reference to FIG. 4A, an example of a mobile computing device 400 for implementing the aspects is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. According to an aspect, the display 405 of the mobile computing device 400 functions as an input device (e.g., a touch screen display). If included, an optional side input element 415 allows further user input. According to an aspect, the side input element 415 is a rotary switch, a button, or any other type of manual input element. In alternative examples, mobile computing device 400 incorporates more or fewer input elements. For example, the display 405 may not be a touch screen in some examples. In alternative examples, the mobile computing device 400 is a portable phone system, such as a cellular phone. According to an aspect, the mobile computing device 400 includes an optional keypad 435. According to an aspect, the optional keypad 435 is a physical keypad. According to another aspect, the optional keypad 435 is a "soft" keypad generated on the touch screen display. In various aspects, the output elements include the display 405 for showing a graphical user interface (GUI), a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 400 incorporates peripheral device port 440, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 incorporates a system (i.e., an architecture) 402 to implement some examples. In one example, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA) and wireless phone.

According to an aspect, one or more application programs 450 are loaded into the memory 462 and run on or in association with the operating system 464. Examples of the application programs 450 include phone dialer programs, e-mail programs, personal information management (PIM) programs, word processing programs, spreadsheet programs, Internet browser programs, messaging programs, and so forth. According to an aspect, deviation finder 150 is loaded into memory 462. The system 402 also includes a non-volatile storage area 468 within the memory 462. The non-volatile storage area 468 is used to store persistent information that should not be lost if the system 402 is powered down. The application programs 450 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400.

According to an aspect, the system 402 has a power supply 470, which is implemented as one or more batteries. According to an aspect, the power supply 470 further includes an external power source, such as an AC adapter or a powered docking cradle that supplements or recharges the batteries.

According to an aspect, the system 402 includes a radio 472 that performs the function of transmitting and receiving radio frequency communications. The radio 472 facilitates wireless connectivity between the system 402 and the "outside world," via a communications carrier or service provider. Transmissions to and from the radio 472 are conducted under control of the operating system 464. In other words, communications received by the radio 472 may be disseminated to the application programs 450 via the operating system 464, and vice versa.

According to an aspect, the visual indicator 420 is used to provide visual notifications and/or an audio interface 474 is used for producing audible notifications via the audio transducer 425. In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. According to an aspect, the system 402 further includes a video interface 476 that enables an operation of an on-board camera 430 to record still images, video stream, and the like.

According to an aspect, a mobile computing device 400 implementing the system 402 has additional features or functionality. For example, the mobile computing device 400 includes additional data storage devices (removable and/or non-removable) such as, magnetic disks, optical disks, or tape. Such additional storage is illustrated in FIG. 4B by the non-volatile storage area 468.

According to an aspect, data/information generated or captured by the mobile computing device 400 and stored via the system 402 are stored locally on the mobile computing device 400, as described above. According to another aspect, the data are stored on any number of storage media that are accessible by the device via the radio 472 or via a wired connection between the mobile computing device 400 and a separate computing device associated with the mobile computing device 400, for example, a server computer in a distributed computing network, such as the Internet. As should be appreciated such data/information are accessible via the mobile computing device 400 via the radio 472 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for automatic program regression detection, comprising: gathering, on a user device, system events into a first trace; in response to observing an update to the user device, gathering system events occurring after the update into a second trace; in response to observing a regression on the user device, comparing the first trace to the second trace to identify deviations in system events between the first trace and the second trace; ranking the identified deviations based on their respective run lengths, wherein the identified deviations ranked based on their respective run lengths include at least a first predetermined number of different system events occurring over a run of a second predetermined number of system events; identifying a start of a longest run of the deviations in system events in the second trace; indicating the start of the longest run as a regression point; identifying a program associated with the regression point; and transmitting the regression point to a support services application associated with the identified program.

2. The method of claim 1, wherein the system events gathered into the first trace and the system events occurring after the update gathered into the second trace include instructions observed on a processor of the user device.

3. The method of claim 2, wherein the instructions observed on the processor are normalized into instructional blocks according to a function index.

4. The method of claim 3, wherein indicating the regression point includes indicating a function from the function index associated with the instructional block in which the regression point occurs.

5. The method of claim 1, wherein multiple starts of runs of deviations in system events in the second trace are provided in a ranked list based on lengths of the runs.

6. The method of claim 1, wherein the support services application is run on a remote device associated with a developer of the program associated with the regression point.

7. The method of claim 1, wherein the system events include local processes run on the user device and remote processes run on a remote device.

8. A system for automatic program regression detection, comprising: a processor; and a memory storage device, including computer code that when executed by the processor is operable to provide: an instruction collector, configured to observe instructions executed by the processor and organize the instructions observed into a plurality of traces; an instruction normalizer, in communication with the instruction collector, configured to group pluralities of instructions into instructional blocks according to a function index; and a trace comparator, in communication with the instruction normalizer, configured to identify deviations in the instructional blocks of a first trace of the plurality of traces from the instructional blocks of a second trace of the plurality of traces, wherein the trace comparator is further configured to: rank the identified deviations based on their respective run lengths, wherein the identified deviations ranked based on their respective run lengths include at least a first predetermined number of different system events occurring over a run of a second predetermined number of system events; indicate the start of the longest run of the identified deviations as a regression point; identify a program associated with the regression point; and transmit the regression point to a support services application associated with the identified program.

9. The system of claim 8, wherein the instructions are organized into the plurality of traces according to execution sequence for a given process on the processor.

10. The system of claim 9, wherein the processor is one of a plurality of processors, the instructions are organized into the plurality of traces based on a given processor of the plurality of processors on which the instructions are executed.

11. The system of claim 8, wherein a new trace of the plurality of traces is generated in response to a system update affecting at least one of:
a software update;
a hardware update;
a software settings update; and
a hardware settings update.

12. The system of claim 8, wherein the instruction normalizer includes a sequence of machine-level instructions in a given instructional block based on prior observations of the sequence of machine-level instructions.

13. The system of claim 8, wherein the deviations identified by the trace comparator are ranked according to a number of different instructional blocks between the first trace and the second trace occurring in a deviation run.

14. A computer readable storage device including instructions that when executed by a processing unit perform steps for automatic program regression detection, comprising: gathering, on a user device, system events into a first trace; in response to observing an update to the user device, gathering system events occurring after the update into a second trace; in response to observing a regression on the user device, comparing the first trace to the second trace to identify deviations in system events between the first trace and the second trace; ranking the identified deviations based on the respective run lengths of each identified deviation, wherein the identified deviations ranked based on their respective run lengths include at least a first predetermined number of different system events occurring over a run of a second predetermined number of system events; identifying a start of a longest run of the deviations in system events in the second trace; indicating the start of the longest run as a regression point; identifying a software program associated with the regression point; and transmitting the regression point to a support services application associated with the identified software program.

15. The computer readable storage device of claim 14, wherein the system events gathered into the first trace and the system events occurring after the update gathered into the second trace include instructions observed on a processor of the user device and are normalized into instructional blocks according to a function index.

16. The computer readable storage device of claim 14, wherein multiple starts of runs of deviations in system events in the second trace are provided in a ranked list based on lengths of the runs.

17. The computer readable storage device of claim 14, wherein the system events include local processes run on the user device and remote processes run on a remote device.

18. The method of claim 1, wherein the identified deviations ranked based on their respective run lengths include system events shared between the first trace and the second trace.

19. The method of claim 1, further comprising:
   determining that the update is a first update type and gathering system events occurring after the update into the second trace; and
   determining that the update is a second update type and not gathering system events occurring after the update.

\* \* \* \* \*